(12) United States Patent
Stout et al.

(10) Patent No.: US 9,477,376 B1
(45) Date of Patent: Oct. 25, 2016

(54) PRIORITIZING CONTENT BASED ON USER FREQUENCY

(71) Applicant: Google Inc., Mountain View, CA (US)

(72) Inventors: James Stout, Mountain View, CA (US); Philip Hendrix, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 894 days.

(21) Appl. No.: 13/720,931

(22) Filed: Dec. 19, 2012

(51) Int. Cl.
*G06F 3/00* (2006.01)
*G06F 3/048* (2013.01)
*G06F 3/0482* (2013.01)

(52) U.S. Cl.
CPC .................................. *G06F 3/0482* (2013.01)

(58) Field of Classification Search
None
See application file for complete search history.

(56) References Cited

U.S. PATENT DOCUMENTS

| | | | | |
|---|---|---|---|---|
| 5,420,975 A * | 5/1995 | Blades | .................. | G06F 3/0482 715/811 |
| 5,852,440 A * | 12/1998 | Grossman | ............. | G06F 3/0481 715/811 |
| 6,061,576 A * | 5/2000 | Terrasson | .......... | H04M 1/72583 455/566 |
| 6,112,215 A * | 8/2000 | Kaply | .................. | G06F 3/04895 707/999.104 |
| 6,959,319 B1 * | 10/2005 | Huang | .............. | G06F 17/30867 705/14.73 |
| 7,052,277 B2 * | 5/2006 | Kellman | .................. | G09B 7/00 434/118 |
| 7,565,622 B2 * | 7/2009 | Chen | ..................... | G06F 3/0482 715/810 |
| 7,614,004 B2 * | 11/2009 | Milic-Frayling | . | G06F 17/30873 715/762 |
| 7,870,250 B2 * | 1/2011 | Nauerz | ............. | G06F 17/30873 707/722 |
| 7,941,491 B2 * | 5/2011 | Sood | ....................... | H04L 51/12 709/206 |
| 8,375,073 B1 * | 2/2013 | Jain | ..................... | G06F 17/3053 707/729 |
| 8,375,080 B2 * | 2/2013 | Kim | .................. | G06F 17/30867 709/203 |
| 8,463,896 B2 * | 6/2013 | Breau | ............... | G06F 17/30864 705/14.73 |
| 8,707,201 B1 * | 4/2014 | Aradhye | ............. | G06F 17/3053 715/204 |

(Continued)

*Primary Examiner* — Yongjia Pan
(74) *Attorney, Agent, or Firm* — McDermott Will & Emery LLP

(57) ABSTRACT

Various aspects of the subject technology relate to systems, methods, and machine-readable media for prioritizing content items based on a request frequency for a user. A system is configured to receive a request for a user interface containing content items for a user, retrieve, in response to the request for the user interface containing content items for the user, a set of content items for the user, and calculate a request frequency score for the user based on a frequency of user requests for the user interface containing content items for the user. The system may further be configured to adjust a priority score for each content item in the set of content items based on the request frequency score for the user and provide the set of content items for display to the user based on the priority score for each content item.

18 Claims, 5 Drawing Sheets

(56) References Cited

U.S. PATENT DOCUMENTS

| | | | | |
|---|---|---|---|---|
| 8,918,404 B1* | 12/2014 | Dachille | ............. | G06F 17/3089 707/748 |
| 2001/0019338 A1* | 9/2001 | Roth | .................... | G06F 3/0482 715/811 |
| 2002/0075302 A1* | 6/2002 | Simchik | ............ | G06F 17/30905 715/745 |
| 2003/0063128 A1* | 4/2003 | Salmimaa | ........... | G06F 3/04817 715/810 |
| 2003/0065706 A1* | 4/2003 | Smyth | ................ | G06F 17/30867 709/200 |
| 2005/0102186 A1* | 5/2005 | Buil | .................. | G06Q 30/0601 705/26.1 |
| 2007/0226355 A1* | 9/2007 | Luckhardt | ............... | G06F 17/24 709/227 |
| 2008/0052639 A1* | 2/2008 | Chun | .................... | G06F 3/0482 715/810 |
| 2008/0208847 A1* | 8/2008 | Moerchen | ......... | G06F 17/30696 |
| 2009/0019394 A1* | 1/2009 | Sekimoto | ........... | H04N 5/44543 715/811 |
| 2010/0042949 A1* | 2/2010 | Chen | ............... | H04M 1/274583 715/811 |
| 2011/0022982 A1* | 1/2011 | Takaoka | ........... | G06F 3/04817 715/810 |
| 2011/0066977 A1* | 3/2011 | DeLuca | ........... | G06F 17/30867 715/811 |
| 2012/0005209 A1* | 1/2012 | Rinearson | ......... | G06F 17/30908 707/737 |
| 2012/0054144 A1* | 3/2012 | Barbieri | ............ | G06F 17/30044 706/52 |
| 2012/0079400 A1* | 3/2012 | Nauerz | .................. | G06T 11/206 715/762 |
| 2012/0221563 A1* | 8/2012 | De | ................... | G06Q 10/06311 707/728 |
| 2013/0158984 A1* | 6/2013 | Myslinski | ............... | G06F 17/28 704/9 |
| 2015/0113483 A1* | 4/2015 | Van Der Westhuizen | ........ | G06F 3/04812 715/850 |

* cited by examiner

100

PRIORITIZING CONTENT BASED ON USER FREQUENCY

BACKGROUND

Various types of services provide users with content items. For example, news websites gather a number of news articles and present users links to the news articles. Social networking websites or applications may be configured to gather content items (e.g., posts, notifications, or other social stream items) published by other users of the social network and display the published content items to a user.

SUMMARY

Various aspects of the subject technology relate to a system for prioritizing content items based on a request frequency for a user. The system includes one or more processors and a machine-readable medium comprising instructions stored therein, which when executed by the one or more processors, cause the one or more processors to perform operations. The operations include receiving a request for content items for a user, retrieving, in response to the request, a set of content items for the user, and calculating a request frequency score for the user based on a frequency of user requests for content items for the user. The operations may further include adjusting a priority score for each content item in the set of content items based on the request frequency score for the user and providing the set of content items for display to the user based on the priority score for each content item.

These and other aspects can include one or more of the following features. According to some aspects, the priority score for each content item is further calculated based on an age score for the content item and an importance score for the content item. The operations can further include calculating the age score for the content item the content item based on a current date and time and a date and time for when the content item was published. The operations can further include calculating the importance score for the content item the content item based on at least one of a subject associated with the content item, keywords associated with the content item, a number of times the content item has been viewed, a number of times the content item has been republished, a number of times the content item has been socially endorsed, or a source of the content item.

According to some aspects, the calculating of the request frequency score for the user may include identifying entries in the request history corresponding to requests received during a period of time and determining the average number of requests received during the period of time based on the identified entries. The request frequency score for the user may be calculated based on the average number of requests received during the period of time.

The operations, according to some aspects, may also include storing, in response to the receiving of the request, an entry in the request history for the user, wherein the entry comprises a timestamp corresponding to when the request is received. The entry is stored after or before the calculating of the request frequency score. The request for content items may be a request for a webpage comprising the content items. The providing of the set of content items for the display to the user may include transmitting a prioritized list of the set of content items to a client device associated with the user.

Other aspects of the subject technology relate to a method for prioritizing content items based on a request frequency for a user. The method includes receiving a request for a user interface containing content items for a user, retrieving, in response to the request for the user interface containing content items for the user, a set of content items for the user, and calculating a request frequency score for the user based on a frequency of user requests for the user interface containing content items for the user. The method may further include adjusting a priority score for each content item in the set of content items based on the request frequency score for the user, and providing the set of content items for display to the user based on the priority score for each content item.

These and other aspects can include one or more of the following features. In some aspects, the priority score for each content item is further adjusted based on an age score for the content item and an importance score for the content item. The method may further include calculating the age score for the content item the content item based on a current date and time and a date and time for when the content item was published and calculating the importance score for the content item the content item based on at least one of a subject associated with the content item, keywords associated with the content item, a number of times the content item has been viewed, a number of times the content item has been republished, a number of times the content item has been socially endorsed, or a source of the content item.

In some aspects, the calculating of the request frequency score for the user may include identifying entries in a request history corresponding to requests for the user interface containing content items for the user received during a period of time and determining an average number of requests received during the period of time based on the identified entries. The request frequency score for the user is calculated based on the average number of requests received during the period of time.

The method, in accordance with some aspects, can also include storing, in response to the receiving of the request, an entry in the request history for the user, wherein the entry comprises a timestamp corresponding to when the request is received. The entry is stored prior to the calculating of the request frequency score or after the calculating of the request frequency score.

According to some aspects, the request for content items includes a request for a webpage comprising the content items. The providing of the set of content items for the display to the user can include generating the webpage comprising the content items and transmitting the webpage to a client device associated with the user. In other aspects, the providing of the set of content items for the display to the user comprises transmitting a prioritized list of the set of content items to a client device associated with the user.

In accordance with some aspects, a higher request frequency score for the user is associated with the priority score for each content item being calculated with less emphasis on the importance score for the content item relative to the age score for the content item.

Various aspects of the subject technology relate to a non-transitory machine-readable medium comprising instructions stored therein, which when executed by a machine, cause the machine to perform operations for prioritizing content items based on a request frequency for a user. The operations may include receiving a request for content items for a user, calculating a request frequency score for the user based on at least one previous request for content items for the user, retrieving, in response to the request, a set of content items for the user, calculating a priority score for each content item in the set of content items based on the request frequency for the user, an age score for the content item, and an importance score for the content item, and providing the set of content items for the display to the user based on the priority score for each content item.

These and other aspects can include one or more of the following features. According to some aspects, the calculating of the request frequency score for the user may include determining the average number of requests received during a period of time based on the at least one previous request for content items, wherein the request frequency score for the user is calculated based on the average number of requests received during the period of time.

These and other aspects may provide one or more of the following advantages. By taking into consideration the frequency in which a user requests content items from a system, aspects of the subject technology are able to provide a user with a custom prioritization of content items. For example, if the user frequently retrieves content items, the prioritization of the content items may be based more heavily on how recent the content items were published. If, on the other hand, the user retrieves content items less frequently, the prioritization of the published content items may be based more heavily on the importance scores calculated for the content items.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

Figure 1:
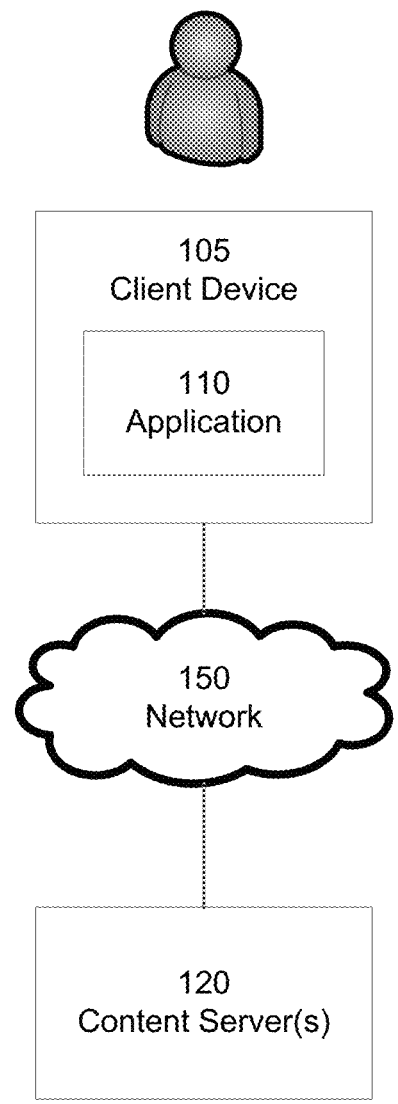
FIG. 1 is a block diagram illustrating an example networked environment in which a system configured to prioritize content items based on a user frequency score may exist, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details.

Various types of services (e.g., social networking websites, news websites, or other digital content aggregators) provide for the display of published content items to users. Content items may include articles, photos, videos, music, blog entries, reviews, search results, messages, status updates, notifications (e.g., check-in notifications), or any other content that can be communicated. These services can prioritize the content items for display based on a date associated with each content item (e.g., when the content item was published or created) and an importance score for the content item. The importance score may be calculated based on, for example, a popularity score, an importance score, how many users have selected or read the content item, the topic of the content item, or other characteristics of the content item.

However, prioritizing content items based on when the content items were published and importance scores for the content items may not be optimal in all situations. For example, a users that retrieves published content items from a service very frequently (e.g., several times a day) may need to skip over important content items that the user has already seen in order to view less important, but more recent, content items that the user has yet to see. Another user that retrieves published content items less frequently (e.g., once a month) may need to scroll past several content items that have been published more recently to get to content items of higher importance.

Various aspects of the subject technology relate to a system configured to prioritize published content items based on a user frequency score. The user frequency score may be a score that indicates how frequently a user interacts with the service (e.g., by visiting a website associated with the service), how frequently a service delivers content items to a user, how frequently a user retrieves the content items from a service, or how frequently the user performs another action.

By taking into consideration a user frequency score, aspects of the subject technology are able to provide the user with a personalized prioritization of published content items. For example, if the user frequently retrieves published content items or frequently visits a website that publishes the content items, the prioritization of the published content items may be based more heavily on how recent the content items were published. If, on the other hand, the user retrieves published content items less frequently or visits the website less frequently, the prioritization of the published content items may based more heavily on the importance scores calculated for the content items.

FIG. 1 is a block diagram illustrating an example networked environment 100 in which a system configured to prioritize content items based on a user frequency score may exist, in accordance with various aspects of the subject technology. Although FIG. 1 illustrates a client-server network environment 100, other aspects of the subject technology may include other configurations including, for example, peer-to-peer or single system environments. The network environment includes at least one client device 105 and one or more content servers 120 connected via a network 150 (e.g., the Internet).

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The client device 105 can be any machine able to communicate with the content servers 120 via the network 150. Client devices 105 and 110 may include, for example, desktop computers, laptops, mobile devices (e.g., smart phones, tablets, personal digital assistants (PDAs), smart displays, etc.), or any other machine with a processor, memory, and communications capabilities.

The client device 105 may also include an application 110, such as a web browser or a dedicated program (e.g., an "app" for a mobile device), that is configured to interact with one or more services hosted by the content servers 120. For example, if the application 110 is a web browser, the user can instruct the web browser to visit a webpage, hosted by the content servers, that contains published content items. In response to the instructions, the web browser may request the webpage, receive the webpage from the content servers 120, and display the webpage to the user in a user interface. If the application 110 is a program associated with the one or more services (e.g., a social networking service or a news aggregator service) hosted by the content servers 120, the user may use the program to request and receive published content items from the content servers 120.

The content servers 120 may be systems or devices having a processor, a memory, and communications capability that may be used host one or more services that store and provide client devices with digital content. As described above, the services may include a social networking service or a news aggregator service, however, they are not limited to those services. For example, the services may also include a messaging or communications service or any other service configured to provide content items to the user. The content servers 120 may also host a system that is configured to prioritize published content items based on a user frequency score.

Figure 2:
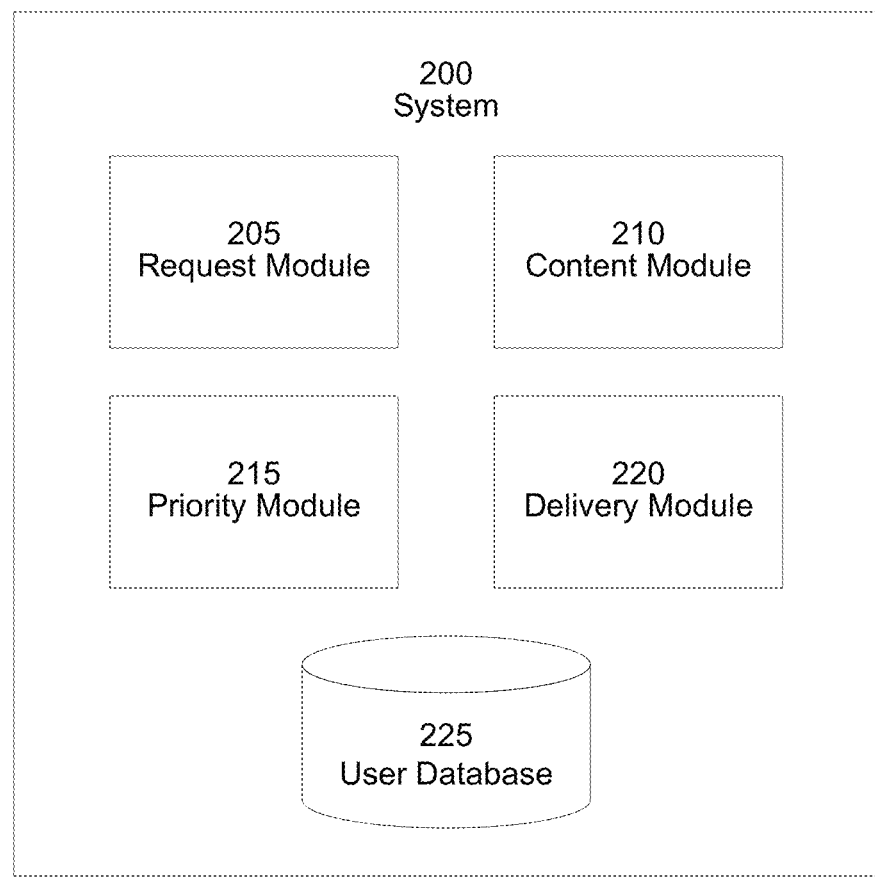
FIG. 2 is a block diagram illustrating an example system configured to prioritize published content items based on a user frequency score, in accordance with various aspects of the subject technology.

FIG. 2 is a block diagram illustrating an example system 200 configured to prioritize published content items based on a user frequency score, in accordance with various aspects of the subject technology. The system 200 may include a request module 205, a content module 210, a priority module 215, and a delivery module 220. In other aspects, however, the system 200 may include additional components, fewer components, or different components.

The request module 205 is configured to receive a request for content items for a user. The request may be received from an application 110 on a client device 105 and be in the form of a request for a webpage containing content items, a query for content items that match certain query parameters, or another request for content items.

When the request is received, the request module 205 may also store a record of the request in a user database 225. For example, the user database 225 may include request histories for a number of users and the request module 205 can create an entry in the request history for the user submitting the request that includes a timestamp for when the request was received and, in some cases, request details such as the type of content items being requested or a universal resource identifier (URI) for the website that is being requested. The entries in the request history for the user may later be used to determine a frequency of a certain action associated with the user.

In response to receiving a request, the content module 210 can retrieve a set of content items to be delivered to the user. The set of content items may be retrieved from a data repository (e.g., a database or other memory) storing content items. The set of published content items may or may not be related to the request. For example, the content items may be for a requested web page or the content items may have been identified by the content module 210 based on the query parameters. In other aspects, the content items may be any content items that the user submitting the request is authorized to view.

The priority module 215 may be configured to prioritize the retrieved set of content items by, for example, calculating a priority score for each content item. The priority score may represent a measure of where each content item should be displayed to the user. As such, those content items with high priority scores may be placed in a position or location (e.g., higher in a list, with a visual indicator, or in a special area) of greater importance or visibility relative to content items with lower priority scores.

The priority score may be calculated based on a number of different signals or variables. As will be discussed in more detail further below, the priority score may be calculated based on, for example, user preferences, how recently a content item was created, uploaded, or published, measures of how popular a content item is, the topic or content of a content item, the source of the content item, or any other characteristics associated with the content items. The priority score is also calculated based on how frequently a user visits a website and/or how frequently the user requests or retrieves content items from the system 200.

In to some aspects, the priority score may be calculated such that if a user's frequency in visiting a website or retrieving content items is high, the ages of the content items (e.g., how recently each content item was created, uploaded, or published) will be more heavily weighted when calculating the priority score relative to other factors. If the user's frequency is low, the ages of the content items will be weighted less when calculating the priority score relative to other factors.

The delivery module 220 is configured to transmit the requested content items to the application 110 on the client device 105 according to the priority scores for the content items. For example, the delivery module 220 may transmit the requested content items as a list of content items prioritized or ordered based on the priority score for each of the content items. The application 110 may use the prioritized list to display the content items to the user. In another example, the delivery module 220 may generate a webpage that includes the requested content items and the content items may be positions and/or locations of the content items in the generated web page may be based on the priority scores for the content items. Once the webpage is delivered to the application 110, the application 110 may render the webpage on a display.

Figure 3:
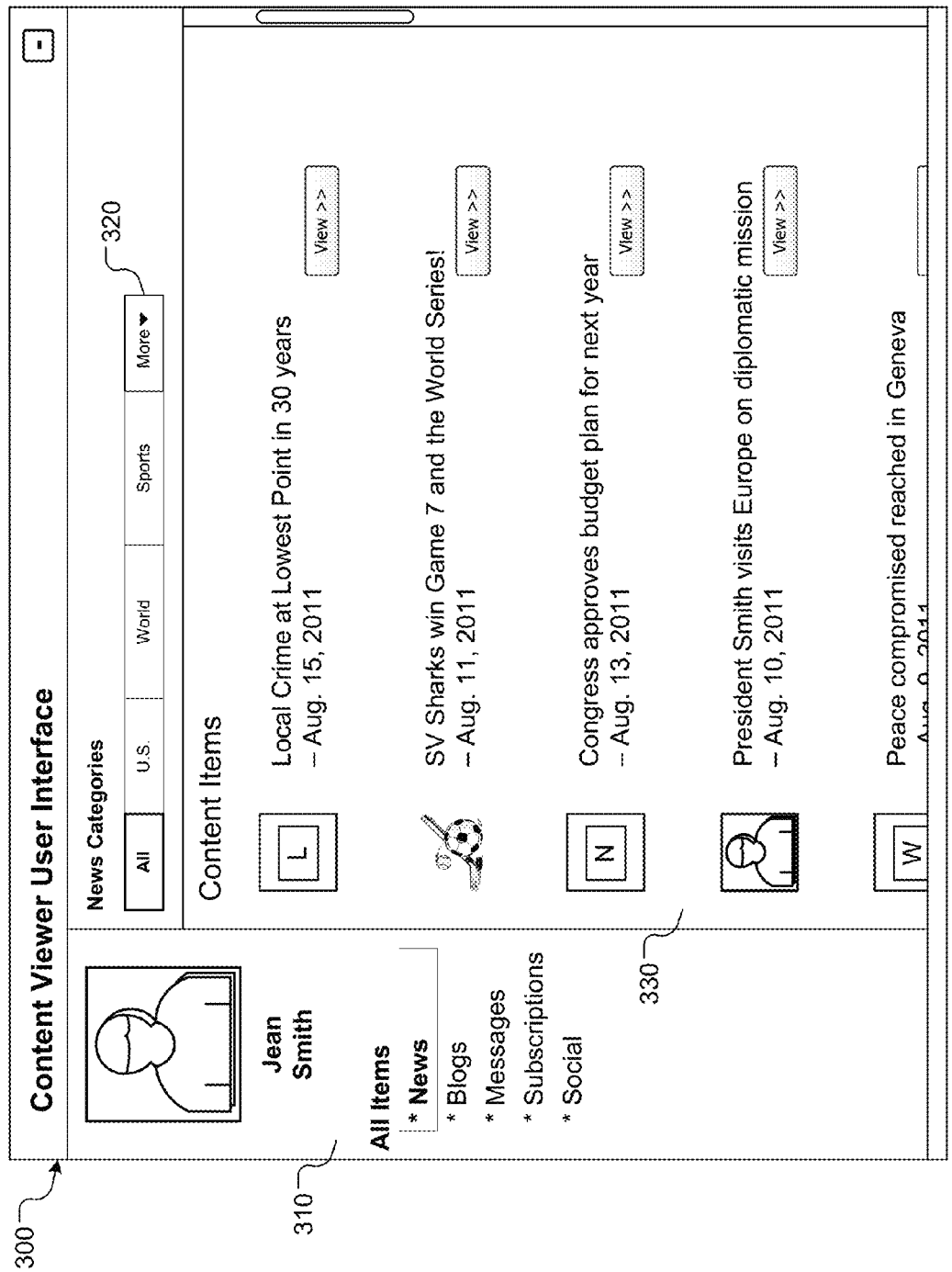
FIG. 3 is an illustration of an example user interface that includes prioritized content items, according to various aspects of the subject technology.

FIG. 3 is an illustration of an example user interface 300 that includes prioritized content items, according to various aspects of the subject technology. In other aspects, however, other user interfaces may be used. The user interface 300 may be displayed to a user via an application 110 on a client device 105 and be in the form of a web browser user interface or other application user interface.

The interface 300 includes a user information panel 310 that may contain a profile picture for the user, the name of the user, and a number of options to for content items to view. For example, the user may select one or more of the options in order to view content items of a particular type or from a particular source. The option to view news content items is selected in the user interface 300 shown in FIG. 3. The interface 300 can also include a user interface element 320 that enables the user to select a category for the selected content option. For example, the categories for the news option include, U.S. news, world news, sports news, and others.

Based on a user selection of a content option and/or a content category, a number of content items may be displayed to the user in a content interface 330. The content items in the content interface 330 are prioritized based on the priority score for each of the content items shown. Although the content items may be displayed in other ways, in the content interface 330 in FIG. 3, the content items are shown as an ordered list where the content item with the highest priority score is shown first (e.g., at the top) and other content items with lower priority scores are ordered below.

Figure 4:
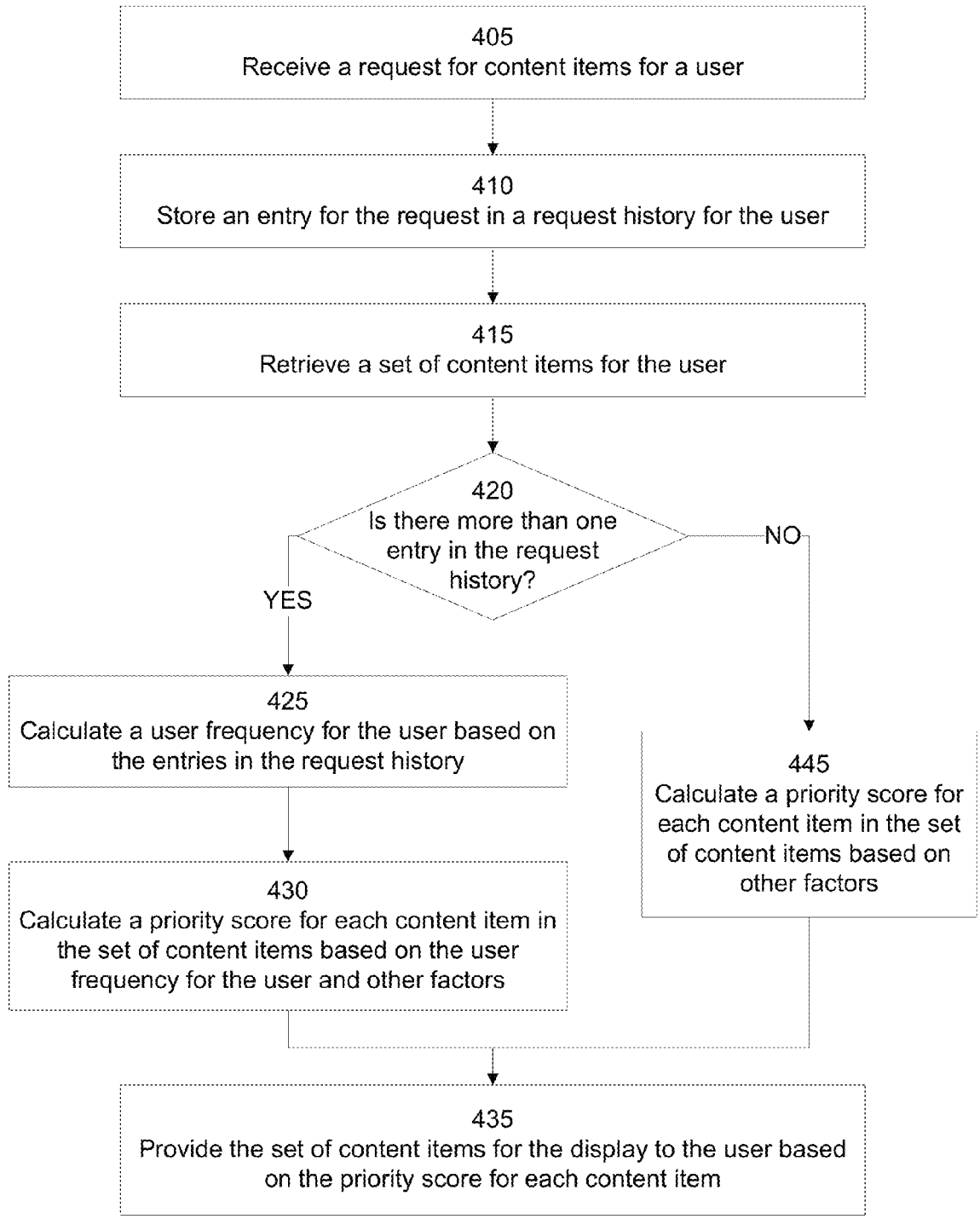
FIG. 4 is a flow chart illustrating an example process for prioritizing published content items based on a user frequency score, in accordance with various aspects of the subject technology.

FIG. 4 is a flow chart illustrating an example process 400 for prioritizing published content items based on a user frequency score, in accordance with various aspects of the subject technology. Although the blocks in process 400 are shown in a particular order, certain blocks may be executed in different orders or at the same time. In addition, although the process blocks of FIG. 4 are described with reference to the components of the system 200 in FIG. 2, the blocks are not limited to being performed by these components.

At block 405, the request module 205 can receive a request for content items for a user from a client device and store an entry for the request in a request history for the user at block 410. The entry includes date and time information (e.g., a timestamp) that corresponds to when the request was made or received. The entry may also include other characteristics of the request for content items such as the webpage requested if one is requested, query parameters for the requested content items, or other characteristics.

The request history for the user may be stored in a user profile and/or a user database and contain a number of entries that correspond to the user's request for content items. In response to receiving the request, the content module 210 can retrieve a set of content items for the user that correspond to the user's request at block 415. At block 420, the priority module 215 can determine whether there is more than one entry in the request history for the user such that those entries may be used to calculate a user frequency.

If there request history contains more than one entry corresponding to a user's request for content items, the priority module 215 can calculate a user frequency for the user based on the entries in the request history at block 425. As described above, the user frequency score may be a score that indicates how frequently a user interacts with the system 200, how frequently a service delivers content items to a user, how frequently a user retrieves the content items from a service, or how frequently the user performs another action.

For example, the priority module 215 can calculate a user frequency score based on the timestamps in the entries stored in the request history. For example, the user frequency score may be based on the average number of requests received for a particular period of time (e.g., 6 times a week, 2.3 times a day, 10 times a month). In some variations, only timestamps that occur after a particular date or during the recent past may be used (e.g., for the past year). Furthermore, a weighted average that favors more recent timestamps (e.g., timestamps from the past three months) over older timestamps (e.g., timestamps from last year up till three months ago) may be used.

According to some aspects, different user frequency scores may be calculated based on the type of content requested or the characteristics of the interaction with the system 200. For example, if the request for content items received by the request module 205 is a request for a particular webpage containing content items, the user frequency score may be calculated based on entries in the request history corresponding to requests with the same universal resource locator (URL), requests with a matching component of the URL (e.g., a webpage domain or subdomain), or requests for a webpage containing similar content items. If the received request for content items is in the form of a query, the user frequency score may be calculated based on entries in the request history corresponding to queries of the same type, queries with similar parameters, or queries of the same content sources.

At block 430, the priority module 215 can calculate a priority score for each content item in the set of content items based on a user frequency for the user and other factors. According to one aspect, one of the user frequency scores calculated in block 425 may be selected and used to calculate the priority score for each content item. In other aspects, however, multiple user frequency scores may be combined to form a global user frequency score that is used to calculated the priority score for each content item.

The priority score for each content item is also calculated based on other different signals, factors, or variables associated with the content item. For example, the priority module 215 can also calculate an age score and an importance score for the content item. However, the priority score is not limited to being calculated based on these signals, rather, other signals and variables may also be used. The age score is a measurement of the time that elapsed since the content item was created or published and may be calculated based on the difference between the current time and date and the time and date when the content item was created or published.

The importance score for each content item may be assigned by an administrator or determined based on a number of factors associated with the content item. For example, the system can calculate the importance score based on the topic of the content item or how many users viewed the content item. In the context of social networking content, the importance score can also be calculated based on how many other users share or republish the content item, how many times the content item was socially endorsed (e.g., liked or given a +1 indication) or commented on, the sentiment associated with those social stream items, which may be based on positive or negative words found in the comments, who authored or published the content item (e.g., whether the author of the content item has a relationship with the user), or any other characteristic of the content item.

According to other aspects, additional operations may be performed on one or more of the scores. For example, the age scores for the content items, the importance scores for the content items, and/or the user frequency score for the user may be adjusted before being used to calculate the priority score. Once the age scores, importance score, and the user frequency score for the user requesting the content items are finalized, the priority module 215 can calculate a priority score for each of the content items based on those scores.

According to some aspects, the priority score may be calculated such that the higher the frequency score, the more heavily the age score for a content item is weighted or the importance score may be weighted less in calculating the priority score. If the frequency score is lower, the age score may be weighted less or the importance score may be weighted more in calculating the priority score.

One example calculation may be in the format provided below:

$$\text{Priority Score} = \frac{i(c)}{(f(u))^{a(c)}} \quad \text{Equation (1)}$$

where i(c) is the importance score of the content item c, a(c) is the age score of the content item c, and f(u) is the user frequency score for the user u. Accordingly, as the importance score increases, so does the priority score for the content item. As the age score increases and the age of the content item increases the priority score decreases. Furthermore, the age score affects the priority score more as the user frequency score increases.

Three alternative calculations are provided below:

$$\text{Priority Score} = i(c) - a(c)f(u) \quad \text{Equation (2)}$$

$$\text{Priority Score} = \frac{i(c)}{a(c)f(u)} \quad \text{Equation (3)}$$

$$\text{Priority Score} = \frac{i(c)}{a(c) + f(u)} \quad \text{Equation (4)}$$

In other variations, however, other calculations may be used.

After the priority scores for the published content items are calculated, at block 435, the delivery module 220 may provide the retrieved content items for display to the user based on the priority scores for the content items. For example, the delivery module 220 arrange the content items in a user interface (e.g., a webpage for display in a browser or application display interface) based on the priority score for each of the content items and transmit the user interface to the user's client device. The content items may be placed in different areas in the user interface or ranked based on their priority scores. In other aspects, the delivery module 220 may transmit a list of prioritized content items to the client device where it may be arranged by a web browser or application on the client device and displayed to the user.

If the request history does not contain more than one entry, it may be difficult to calculate an accurate frequency score for the user. Accordingly, at block 445, the priority module 215 can calculate a priority score for each content item based on other factors without using a frequency score for the user such as the age score and the importance score. Once the priority scores are calculated, the delivery module 220 may provide the prioritized content items to the client device for display to the user. As additional user requests are received by the system 200, however, eventually, enough entries in the request history may be made such that the priority module 215 may calculate a frequency score for the user and prioritize the content items based on the user's frequency score.

Figure 5:
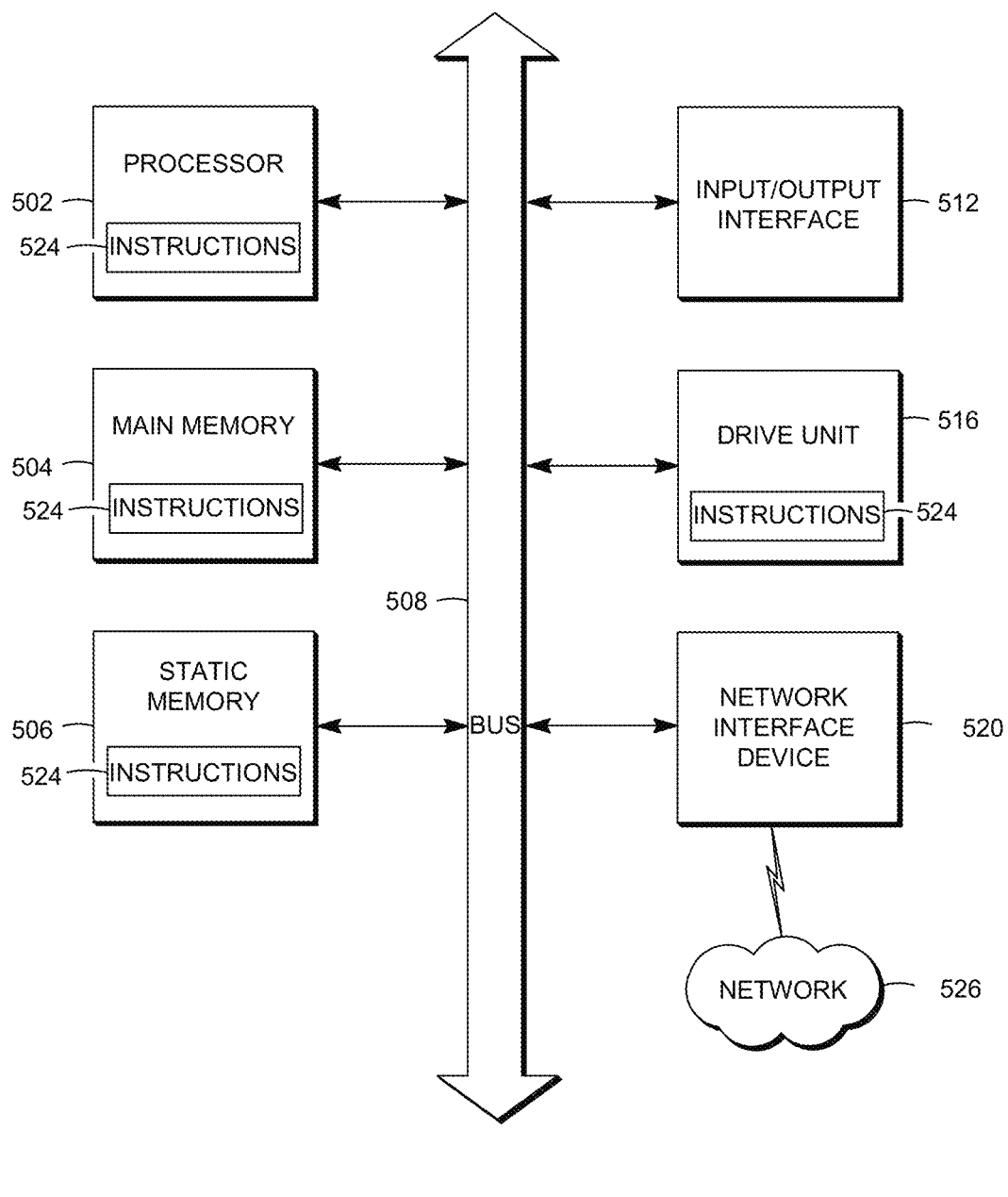
FIG. 5 is a block diagram illustrating an example computer system with which any of the devices, servers, or systems discussed herein may be implemented, in accordance with various aspects of the subject technology.

FIG. 5 is a block diagram illustrating an example computer system 500 with which any of the devices, servers, or systems discussed herein may be implemented, in accordance with various aspects of the subject technology. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the aspects discussed herein. The term "machine-readable medium" shall accordingly be taken to include, but not be limited to, storage mediums such as solid-state memories, optical media, and magnetic media.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps or blocks in the processes disclosed is an illustration of example approaches. Based upon design preferences, it is understood that the specific order or hierarchy of steps or blocks in the processes may be rearranged. Some of the steps or blocks may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
   receiving a request for a user interface configured to display content items to a user;
   retrieving, in response to the request for the user interface, a set of content items corresponding to the request;
   determining that the request is one of a plurality of instances of the request having been received;
   calculating a request frequency score for the user, the request frequency score identifying a frequency at which the plurality of instances of the request were received;
   determining whether the request frequency score exceeds a threshold value;
   adjusting a priority score for at least one content item in the set of content items based on an age score for the at least one content item and an importance score for the at least one content item, the priority score being adjusted based on the age score having a greater weighting than the importance score when the request frequency score exceeds the threshold value, the priority score being adjusted based on the importance score having a greater weighting than the age score when the request frequency score does not exceed the threshold value; and
   providing the at least one content item associated with the adjusted priority score for display to the user.

2. The method of claim 1, further comprising:
   calculating the age score for the content item based on a current date and time and a date and time for when the content item was published; and
   calculating the importance score for the content item based on at least one of a subject associated with the content item, keywords associated with the content item, a number of times the content item has been viewed, a number of times the content item has been republished, a number of times the content item has been socially endorsed, or a source of the content item.

3. The method of claim 1, wherein the calculating of the request frequency score for the user comprises:
   identifying entries in a request history corresponding to the plurality of instances of the request received during a period of time; and
   determining an average number of requests received during the period of time based on the identified entries, wherein the request frequency score is calculated based on the average number of requests received during the period of time.

4. The method of claim 3, further comprising:
   storing, in response to the receiving of the request for the user interface containing content items for the user, an entry in the request history for the user, wherein the entry comprises a timestamp corresponding to when the request is received.

5. The method of claim 4, wherein the entry is stored prior to the calculating of the request frequency score.

6. The method of claim 1, wherein the request for the user interface containing content items for the user comprises a request for a webpage comprising the content items.

7. The method of claim 6, wherein the providing of the set of content items for display to the user comprises:
   generating the webpage comprising the content items; and
   transmitting the webpage to a client device associated with the user.

8. The method of claim 1, wherein the providing of the set of content items for the display to the user comprises transmitting a prioritized list of the set of content items to a client device associated with the user.

9. The method of claim 1, wherein a higher request frequency score for the user is associated with the priority score for each content item being calculated with less emphasis on the importance score for the content item relative to the age score for the content item.

10. A system comprising:
    one or more processors; and
    a machine-readable medium comprising instructions stored therein, which when executed by the one or more processors, cause the one or more processors to perform operations comprising:
    receiving a request for content items for a user;
    retrieving, in response to the request, a set of content items for the user;
    determining that the request is one of a plurality of instances of the request having been received;
    calculating a request frequency score for the user for the user, the request frequency score identifying a frequency at which the plurality of instances of the request were received;
    determining whether the request frequency score exceeds a threshold value;
    adjusting a priority score for each content item in the set of content items based on an age score for each content item and an importance score for each content item, the priority score being adjusted based on the age score having a greater weighting than the importance score when the request frequency score exceeds the threshold value, the priority score being adjusted based on the importance score having a greater weighting than the age score when the request frequency score does not exceed the threshold value; and providing the set of content items for display to the user based on the adjusted priority score for each content item.

11. The system of claim 10, further comprising:
calculating the age score for the content item based on a current date and time and a date and time for when the content item was published.

12. The system of claim 10, further comprising:
calculating the importance score for the content item based on at least one of a subject associated with the content item, keywords associated with the content item, a number of times the content item has been viewed, a number of times the content item has been republished, a number of times the content item has been socially endorsed, or a source of the content item.

13. The system of claim 10, wherein the calculating of the request frequency score for the user comprises:
identifying entries in a request history corresponding to the plurality of instances of the request received during a period of time;
determining an average number of requests received during the period of time based on the identified entries; and
wherein the request frequency score for the user is calculated based on the average number of requests received during the period of time.

14. The system of claim 13, further comprising:
storing, in response to the receiving of the request, an entry in the request history for the user, wherein the entry comprises a timestamp corresponding to when the request is received.

15. The system of claim 14, wherein the entry is stored after the calculating of the request frequency score.

16. The system of claim 10, wherein the request for content items comprises a request for a webpage comprising the content items.

17. A non-transitory machine-readable medium comprising instructions stored therein, which when executed by a machine, cause the machine to perform operations comprising:
receiving a request for content items for a user;
calculating a request frequency score for the user based on at least one previous request for content items for the user, the request frequency score identifying a frequency at which the request and the at least one previous request were received;
retrieving, in response to the request, a set of content items for the user;
determining whether the request frequency score exceeds a threshold value;
calculating a priority score for each content item in the set of content items based on the request frequency score for the user, an age score for the content item, and an importance score for the content item, the priority score being calculated based on the age score having a greater weighting than the importance score when the request frequency score exceeds the threshold value, the priority score being calculated based on the importance score having a greater weighting than the age score when the request frequency score does not exceed the threshold value; and
providing for display the set of content items to the user based on the priority score for each content item.

18. The non-transitory machine-readable medium of claim 17, wherein the calculating of the request frequency score for the user comprises:
determining an average number of requests received during a period of time based on the at least one previous request for content items; and
wherein the request frequency score for the user is calculated based on the average number of requests received during the period of time.

* * * * *